US010455496B2

United States Patent
Wich et al.

(10) Patent No.: US 10,455,496 B2
(45) Date of Patent: Oct. 22, 2019

(54) DETERMINING BASE STATION FRONTHAUL TRANSMISSION CONTROL BASED ON LOOPBACK SIGNAL

(71) Applicant: Alcatel Lucent, Boulogne Billancourt (FR)

(72) Inventors: Andreas Wich, Stuttgart (DE); Dirk Wiegner, Stuttgart (DE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/769,501

(22) PCT Filed: Oct. 6, 2016

(86) PCT No.: PCT/EP2016/073865
§ 371 (c)(1),
(2) Date: Apr. 19, 2018

(87) PCT Pub. No.: WO2017/067791
PCT Pub. Date: Apr. 27, 2017

(65) Prior Publication Data
US 2018/0310244 A1    Oct. 25, 2018

(30) Foreign Application Priority Data
Oct. 21, 2015    (EP) .................................... 15306688

(51) Int. Cl.
*H04B 17/318*    (2015.01)
*H04W 52/24*    (2009.01)
(Continued)

(52) U.S. Cl.
CPC ...... *H04W 52/0206* (2013.01); *H04B 17/336* (2015.01); *H04L 5/0048* (2013.01);
(Continued)

(58) Field of Classification Search
CPC ............. H04W 52/0206; H04W 52/14; H04W 52/241; H04W 52/242; H04W 52/243;
(Continued)

(56) References Cited

U.S. PATENT DOCUMENTS 9,768,983 B2    9/2017   Marzetta et al.
2003/0092456 A1    5/2003   Dent
(Continued)

FOREIGN PATENT DOCUMENTS

JP    2011071705    4/2011
JP    2014230098    12/2014

OTHER PUBLICATIONS

International Search Report for PCT/EP2016/073865 dated Nov. 9, 2016.

*Primary Examiner* — Philip Sobutka
(74) *Attorney, Agent, or Firm* — Fay Sharpe LLP

(57) ABSTRACT

Embodiments relate to apparatuses (10; 20), methods and computer programs for determining transmission control information. The Apparatus (10) is suitable for a base band unit (110) of a base station transceiver (100) of a mobile communication system (300), the base station transceiver (100) further comprising one or more radio units (120) configured to wirelessly communicate with the base band unit (110) using one or more wireless fronthaul links. The apparatus (10) comprises at least one output (12) configured to transmit a downlink component of the one or more wireless fronthaul links to the one or more radio units (120). The apparatus (10) further comprises at least one input (14) configured to receive an uplink component of the one or more wireless fronthaul links from the one or more radio units (120). The apparatus (10) further comprises a control module (16) configured to control the at least one output (12) and the at least one input (14). The control module (16) is further configured to transmit a reference signal via the at
(Continued)

least one output (12) to the one or more radio units (120). The control module (16) is further configured to receive a loopback version of the reference signal via the at least one input (14) from the one or more radio units (120). The control module (16) is further configured to determine transmission control information based on an attenuation of the reference signal determined based on the loopback version of the reference signal. The transmission control information comprises information related to a per-radio unit transmission power to be used by the one or more radio units (120) for transmissions on the one or more wireless fronthaul links. The control module (16) is further configured to provide the transmission control information to the one or more radio units (120) via the at least one output (12).

14 Claims, 6 Drawing Sheets

(51) Int. Cl.

| | |
|---|---|
| *H04L 25/02* | (2006.01) |
| *H04W 52/02* | (2009.01) |
| *H04W 52/14* | (2009.01) |
| *H04W 52/36* | (2009.01) |
| *H04W 52/40* | (2009.01) |
| *H04W 88/08* | (2009.01) |
| *H04B 17/336* | (2015.01) |
| *H04L 5/00* | (2006.01) |
| *H04W 72/04* | (2009.01) |
| *H04W 92/12* | (2009.01) |

(52) U.S. Cl.
CPC ...... *H04L 25/0212* (2013.01); *H04L 25/0224* (2013.01); *H04L 25/0242* (2013.01); *H04L 25/0258* (2013.01); *H04W 52/14* (2013.01); *H04W 52/241* (2013.01); *H04W 52/242* (2013.01); *H04W 52/243* (2013.01); *H04W 52/367* (2013.01); *H04W 52/40* (2013.01); *H04W 72/0473* (2013.01); *H04W 88/085* (2013.01); *H04B 17/318* (2015.01); *H04L 25/0204* (2013.01); *H04L 25/0208* (2013.01); *H04L 25/0228* (2013.01); *H04W 52/245* (2013.01); *H04W 92/12* (2013.01)

(58) Field of Classification Search
CPC . H04W 52/245; H04W 52/367; H04W 52/40; H04W 72/0473; H04W 88/085; H04W 92/12; H04B 17/318; H04B 17/336; H04L 25/0204; H04L 25/0208; H04L 25/0212; H04L 25/0224; H04L 25/0228; H04L 25/0242; H04L 25/0258; H04L 5/0048
USPC .................................................. 455/522, 524
See application file for complete search history.

(56) References Cited

U.S. PATENT DOCUMENTS

| | | |
|---|---|---|
| 2004/0127157 A1 | 7/2004 | Chu et al. |
| 2008/0227461 A1 | 9/2008 | Dayal et al. |
| 2012/0238202 A1 | 9/2012 | Kim et al. |
| 2018/0054772 A1* | 2/2018 | Tan ................ H04W 76/10 |
| 2018/0139634 A1* | 5/2018 | Zhu ................ H04J 14/02 |

* cited by examiner

DETERMINING BASE STATION FRONTHAUL TRANSMISSION CONTROL BASED ON LOOPBACK SIGNAL

TECHNICAL FIELD

Embodiments relate to apparatuses, methods and computer programs for determining transmission control information, more specifically, but not exclusively, based on a loopback version of a reference signal received from one or more radio units.

BACKGROUND

This section introduces aspects that may be helpful in facilitating a better understanding of the invention(s). Accordingly, the statements of this section are to be read in this light and are not to be understood as admissions about what is in the prior art or what is not in the prior art.

Demands for higher data rates for mobile services are steadily increasing. At the same time modern mobile communication systems as 3rd Generation systems (3G) and 4th Generation systems (4G) provide enhanced technologies, which enable higher spectral efficiencies and allow for higher data rates and cell capacities. The demands are growing for both directions of transmission, in the DownLink (DL) for transmission from the network infrastructure to a mobile transceiver, as well as in the UpLink (UL) for transmission from a mobile transceiver to the network infrastructure.

Current mobile communication systems increasingly rely on small cell base stations. Small cell base stations can be used to cover areas where the macro cell base stations do not provide sufficient coverage and capacity and to improve network efficiency. Small cells may appear to be an efficient approach to increase the capacity and improve network efficiency. It is recognized, however, that the potential attractiveness of small cells might only be realized if installation costs can be controlled. Two requirements for a small cell installation might be electrical power and backhaul, which when provided by wired connections may often be costly. A wired connection for electrical power may be eliminated by deriving power from a small wind turbine or solar panel and charging storage batteries, and by decreasing internal power consumption. The second small cell wired connection may be eliminated by using wireless backhaul.

To decrease internal power consumption a repeater-type small cell might be used, that on downlink receives a complex-valued analog baseband signal on a carrier frequency from a backhaul link and re-transmits the baseband signal at an access carrier frequency that accommodates one or more small cell users, and on the uplink receives from one or more small cell users their combined transmitted signals on an access link and re-transmits their combined baseband signals on the backhaul uplink. The repeater small cell might mainly comprise pre-amplifiers, frequency converters, filters and power amplifiers so it might be designed for low-power consumption.

US patent application 2012/238202 A1 discloses a method for transmitting data using relay stations. The method is based on a base station sending a reference signal to relay stations of a mobile communication system via a backhaul link. The relay stations calculate channel parameters based on the received reference signal, and transmit said parameters back to the base station. The base station uses the channel parameters to determine scheduling information for the backhaul link, and transmits the scheduling information to the relay stations. US patent application 2008/227461 A1 discloses a mobile communication system comprising a base station and relay stations. Based on (data or pilot) transmissions by relay stations, the base station calculates adjustments of a transmission power to be used by the relay stations for a link to the base station or for links to other relay stations (for multi-hop relaying).

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the invention(s). Detailed descriptions of a preferred exemplary embodiment adequate to allow those of ordinary skill in the art to make and use the inventive concepts will follow in later sections.

Various embodiments provide apparatuses, methods and computer programs for determining transmission control information for one or more wireless fronthaul links between a base band unit and one or more radio units of a base station transceiver of a mobile communication system. While the quality of the wireless access link, between the radio units and mobile transceivers, might often be continuously measured and optimized, the quality of the wireless fronthaul link might be seen as near-constant and neglected. To setup the connections an evaluation of the transmission characteristics between the base band unit and the one or more radio units may be necessary. To retain a reduced functionality (and thus complexity and power consumption) at the one or more radio units, the evaluation may occur at the base band unit. The base band unit is configured to transmit a reference signal to the one or more radio units, which are in turn configured to loopback a loopback version of the reference signal. Based on the received loopback version, the base band unit may determine a path loss for the transmission, which is then used to determine transmission characteristics (e.g. per-radio unit transmission power) to be used for the wireless fronthaul links at the one or more radio units (and/or the base band unit).

Embodiments provide an apparatus for a base band unit of a base station transceiver of a mobile communication system. The base station transceiver further comprises one or more radio units configured to wirelessly communicate with the base band unit using one or more wireless fronthaul links. The apparatus comprises at least one output configured to transmit a downlink component of the one or more wireless fronthaul links to the one or more radio units. The apparatus further comprises at least one input configured to receive an uplink component of the one or more wireless fronthaul links from the one or more radio units. The apparatus further comprises a control module configured to control the at least one output and the at least one input. The control module is further configured to transmit a reference signal via the at least one output to the one or more radio units. The control module is further configured to receive a loopback version of the reference signal via the at least one input from the one or more radio units. The control module is further configured to determine information related to a per-radio unit transmission power to be used by the one or more radio units for transmissions on the one or more wireless fronthaul links using an attenuation of the reference signal determined based on the loopback version of the reference signal. The control module is further configured to determine transmission control information comprising the information related to the per-radio unit transmission power. The control module is further configured to provide the transmission control information to the one or more radio units via the at least one output. Determining the transmission control information at the base band unit enables a calibration or adjustment of transmission parameters for the establishment or refinement of the wireless fronthaul links. Using the loopback version of the reference signal received from the one or more radio units may enable a deployment of low-complexity radio units, as the radio units might not have to actively determine the transmission control information. Further, no uplink control channel dedicated to transmitting measured characteristics of the one or more wireless fronthaul links may be required.

In at least some embodiments, the control module may be configured to determine the per-radio unit transmission power based on an estimated interference and an estimated path loss. The control module may be configured to estimate the path loss based on the reference signal and the loopback version of the reference signal. Determining the per-radio unit transmission power based on the estimated path loss and the estimated interference may enable a determination of the per-radio unit transmission power without requiring measurements performed by the one or more radio units.

In various embodiments, the control module may be configured to determine the per-radio unit transmission power based on an optimization function. The control module may be configured to determine the per-radio unit transmission power such, that a target Signal-to-Interference and Noise Ratio (SINR), for the uplink component is approximated based on $$SINR_{target,u} = P_{tx_{c_i}} - PL_{u_i} - P_{IF,z,NF}.$$

$SINR_{target,u}$ may be the target SINR for the uplink component.

$P_{tx_{c_i}}$ may be the per-radio unit transmission power of a radio unit i of the one or more radio units. $PL_{u_i}$ may be an the estimated path loss of the uplink component of the radio unit i. $P_{IF,z,NF}$ may be based on an interference power, IF, a thermal noise, z, and a receive noise figure, NF, of the uplink component. Determining the per-radio unit transmission power based on an optimization function on the estimated path loss and the estimated interference may enable a determination of the per-radio unit transmission power without requiring measurements performed by the one or more radio units.

In at least some embodiments, the loopback version of the reference signal corresponds to an analog conversion of the reference signal received at the one or more radio units. The analog conversion enables a deployment of low-complexity radio units, as the radio units might not have to digitally decode the reference signal and determine the transmission control information.

In various embodiments, the control module may be further configured to determine information related to a transmission power to be used by the at least one output for transmissions on the one or more wireless fronthaul links based on the reference signal and the loopback version of the reference signal. The control module may be further configured to adapt the transmitting of the downlink component of one or more wireless fronthaul signals at the at least one output based on the information related to a transmission power to be used on the at least one output. The adaptation based on the reference signal and the loopback version of the reference signal may enable a reuse of information determined for the transmission control information, and may enable an adjustment of the transmissions of the output module.

In various embodiments, the control module may be configured to determine the transmission power to be used by the at least one output for transmissions on the one or more wireless fronthaul links based on an optimization function. The control module may be configured to determine the transmission power to be used by the at least one output such, that a target Signal-to-Interference and Noise Ratio (SINR), for the downlink component is approximated based on $$SINR_{target,d} = P_{tx_{hub_i}} - PL_{d_i} - P_{IF,z,NF}.$$

$SINR_{target,d}$ is the target SINR for the downlink component.

$P_{tx_{hub_i}}$ is the transmission power to be used by the at least one output for transmissions to a radio unit i of the one or more radio units. $PL_{d_i}$ is an estimated path loss of the downlink component for transmissions to the radio unit i. $P_{IF,z,NF}$ may be based on an interference power, IF, a thermal noise, z, and a receive noise figure, NF, of the downlink component. Determining the transmission power to be used by the at least one output based on an optimization function on the estimated path loss and the estimated interference may enable a determination of the transmission power without requiring measurements performed by the one or more radio units. The transmission power to be used by the at least one output may further be used to estimate an overall power consumption/demand at the base band unit for the wireless fronthaul links to the one or more radio units.

In various embodiments, the control module may be further configured to determine information related to a subset of antenna elements of a plurality of antenna elements to be used for transmitting on the one or more wireless fronthaul links. The information related to the transmission power to be used by the at least one output for transmissions on the one or more wireless fronthaul links may comprise the information related to the subset of antenna elements. Changing the subset of antenna elements to be used for transmitting on the one or more wireless fronthaul links may enable further savings in energy consumption or demand.

In at least some embodiments, the control module may be further configured to adapt the receiving of the uplink component of one or more wireless fronthaul signals at the at least one input based on the reference signal and the loopback version of the reference signal. The reference signal and the loopback version of the reference signal may be further used to enable an equalization of the received signal at the input.

In various embodiments, the control module may be further configured to determine an uplink channel estimation matrix and a downlink channel estimation matrix based on the reference signal and the loopback version of the reference signal to determine the transmission control information. The control module may be configured to determine a joint uplink/downlink channel estimation matrix based on the reference signal and the loopback version of the reference signal to determine the transmission control information. Determining both uplink and downlink channels at the base band unit may decrease an overall computation effort and may enable a deployment of less complex radio units.

In at least some embodiments, the control module may be configured to determine the transmission control information based on a path loss of the downlink component and based on a path loss of the uplink component in the loopback version of the reference signal. Determining the transmission control information based on the path loss may support a determination or adjustment of the per-radio unit transmission power to counter the effects of the path loss.

In various embodiments, the control module may be configured to determine information related to a quality of the received uplink component. The control module may be configured to adjust the transmission control information based on the information related to the quality of the received uplink component. Adjusting the transmission control information based on the information related to the quality may enable a continuous adjustment of the one or more wireless fronthaul links, e.g. to account for changes in the external conditions.

In some embodiments, the transmission control information may comprise information related to a power threshold for a transmission of the one or more wireless fronthaul links. The power threshold may e.g. be used to indicate a lower boundary for the transmission power required to statistically achieve a desired received power.

In various embodiments, the control module may be configured to provide the transmission control information to the one or more radio units individually, which may decrease an overhead on the individual wireless fronthaul links.

In at least some embodiments, the control module may be further configured to determine the transmission control information based on a cell coverage plan of the one or more radio units. The cell coverage plan may e.g. be used to determine approximate initial transmission control information which may be refined during operation.

In various embodiments, the control module may be configured to determine the transmission control information without using information related to a channel estimation of the one or more wireless fronthaul links carried out at the one or more radio units, which may enable a deployment of lower-complexity radio units.

Embodiments further provide a base band unit comprising the apparatus the base band unit.

Embodiments further provide an apparatus for a radio unit of a base station transceiver of a mobile communication system. The base station transceiver further comprises a base band unit wirelessly communicating with the radio unit using a wireless fronthaul link. The apparatus comprises at least one input configured to receive a downlink component of the wireless fronthaul link from the base band unit. The apparatus further comprises at least one output configured to transmit an uplink component of the wireless fronthaul links to the base band unit. The apparatus further comprises a control module configured to control the at least one input and the at least one output. The control module is further configured to receive a reference signal via the at least one input from the base band unit. The apparatus is further configured to loopback a loopback version of the received reference signal via the at least one output to the base band unit. The apparatus is further configured to receive transmission control information from the base band unit. The transmission control information comprises information related to a per-radio unit transmission power to be used by the radio unit for transmissions on the wireless fronthaul link. The control module is further configured to adapt the transmission power of the uplink component, e.g. a transmission amplifier for the uplink band at the radio unit, via the at least one output based on the transmission control information. Determining the transmission control information at the base band unit enables a calibration or adjustment of transmission parameters for the establishment or refinement of the wireless fronthaul links. Using the loopback version of the reference signal received from the one or more radio units may enable a deployment of low-complexity radio units, as the radio units might not have to actively determine the transmission control information. Further, no uplink control channel dedicated to transmitting measured characteristics of the one or more wireless fronthaul links may be required.

In at least some embodiments, the control module may be configured to determine the loopback version of the received reference signal by analogously converting the received reference signal. The analog conversion enables a deployment of low-complexity radio units, as the radio units might not have to digitally decode the reference signal and determine the transmission control information.

In various embodiments, the downlink component may use a downlink carrier frequency and the uplink component uses an uplink carrier frequency. The control module may be configured to determine the loopback version of the received reference signal by analogously converting the received reference signal from the downlink carrier frequency to the uplink carrier frequency. The conversion between frequencies may enable a provision of transmission control information for frequency-division duplex networks, where uplink and downlink components use different frequency bands.

Embodiments further provide a radio unit providing the apparatus for the radio unit. Embodiments further provide a base station transceiver comprising the apparatus for the base band unit and the apparatus for the radio unit.

Embodiments further provide a method for a base band unit of a base station transceiver of a mobile communication system. The base station transceiver further comprises one or more radio units configured to wirelessly communicate with the base band unit using one or more wireless fronthaul links. The method comprises transmitting a reference signal to the one or more radio units. The method further comprises receiving a loopback version of the reference signal from the one or more radio units. The method further comprises determining information related to a per-radio unit transmission power to be used by the one or more radio units for transmissions on the one or more wireless fronthaul links using an attenuation of the reference signal determined based on the loopback version of the reference signal. The method further comprises determining transmission control information comprising the information related to the per-radio unit transmission power.

The method further comprises providing the transmission control information to the one or more radio units.

Embodiments further provide a method for a radio unit of a base station transceiver of a mobile communication system. The base station transceiver further comprises a base band unit wirelessly communicating with the radio unit using a wireless fronthaul link. The method comprises receiving a reference signal from the base band unit. The method further comprises looping back a loopback version of the received reference signal to the base band unit. The method further comprises receiving transmission control information from the base band unit. The transmission control information comprises information related to a per radio-unit transmission power to be used by the radio unit for transmissions on the wireless fronthaul link. The method further comprises adapting the transmission power for transmissions on the wireless fronthaul link based on the transmission control information.

Embodiments further provide computer program product comprising a computer readable medium having computer readable program code embodied therein, the computer readable program code being configured to implement any of the methods, when being loaded on a computer, a processor, or a programmable hardware component.

Embodiments further provide a computer program having a program code for performing the above method, when the computer program is executed on a computer, a processor, or a programmable hardware component. A further embodiment is a computer readable storage medium storing instructions which, when executed by a computer, processor, or programmable hardware component, cause the computer to implement one of the methods described herein.

BRIEF DESCRIPTION OF THE FIGURES

Some other features or aspects will be described using the following non-limiting embodiments of apparatuses or methods or computer programs or computer program products by way of example only, and with reference to the accompanying figures, in which.

DESCRIPTION OF EMBODIMENTS

Figure 1:
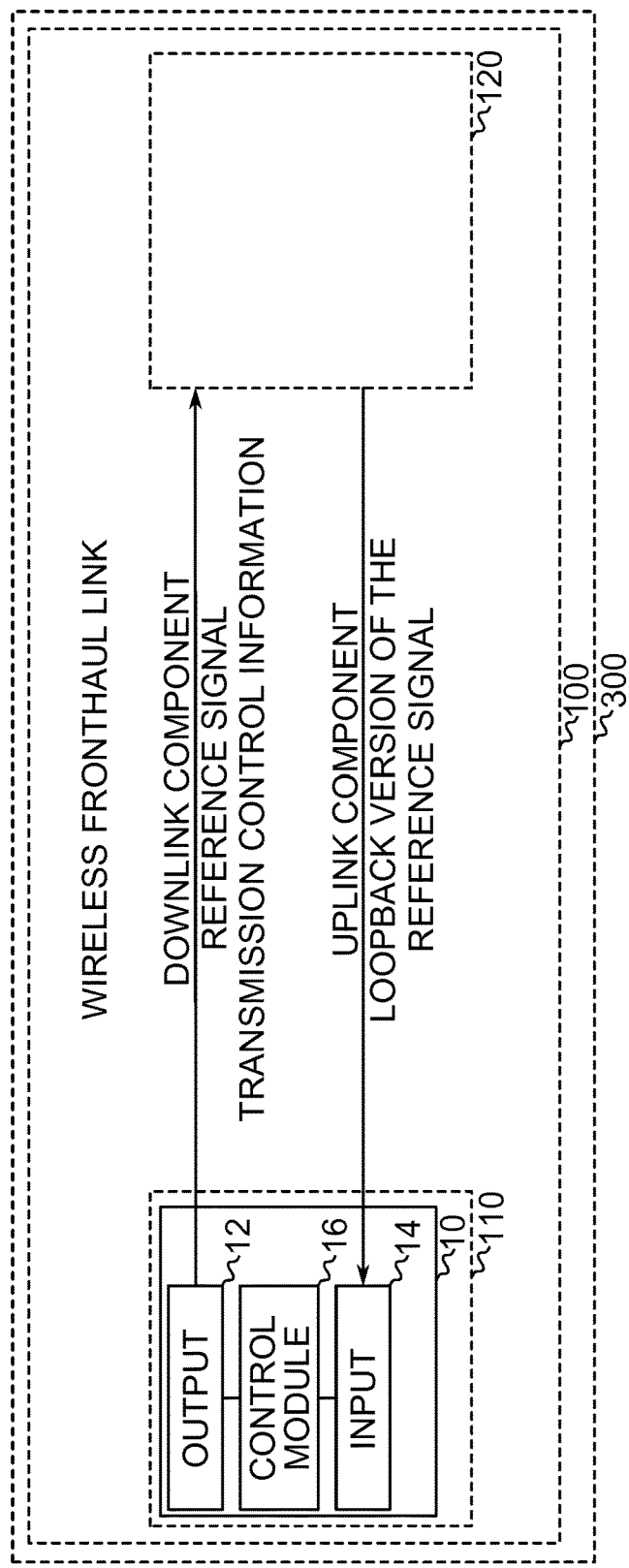
FIG. 1 illustrates a block diagram of an embodiment of an apparatus for a base band unit of a base station transceiver of a mobile communication system.

Various example embodiments will now be described more fully with reference to the accompanying drawings in which some example embodiments are illustrated. In the figures, the thicknesses of lines, layers or regions may be exaggerated for clarity. Optional components are illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

For easy deployment of a dense small cell network, it may be beneficial to connect the small cells wirelessly to the mobile communication system. A Point-to-MultiPoint (P2MP) enabled Massive Multiple Input Multiple Output (MMIMO) system may fronthaul (via a MMIMO hub base station) easy to deploy low complexity, low functionality, low cost & energy radio units (or small cells, e.g. Small Cell Cubes, SCCs, which may correspond to radio units of one or more radio units 120 as introduced in the description of FIG. 1), which may act as mere RF shifters, receiving a signal via MMIMO multi-user beamforming and forwarding it in a regular small cells operation to the end user in access. For an additional complexity decrease for Frequency Division Duplex (FDD) small cells, the MMIMO operation may be performed in FDD. This may include a joint downlink/ uplink channel matrix estimation.

A technical problem that may arise in such a system is the near-far problem of the small cells deployment, although the SCCs are stationary and will not be moved around once deployed. For fronthauling application, the fronthaul may have to fulfill a tough SINR requirement, which may increase the effort in terms of transmit power and thus energy consumption (among others). Depending on the (distance dependent) path loss, the small cell cube (e.g. a radio unit of one or more radio units 120 as introduced subsequently) may fulfill a $SINR_{min}$ requirement (minimum Signal-to-Interference-and-Noise-Ratio), while, without additional measures, other SCCs may overachieve because of a reduced path loss (positioned closer to the MMIMO array, e.g. of a base band unit 110 as introduced subsequently), overdrive the hubs receiver, or reduce its dynamic range. Also, for dynamic switch-on/off of SCCs e. g. for networking reasons (no users to be served), the power values of the hub may be adapted for energy saving, as the hubs transmit power may be split over all SCCs in operation.

A closed loop power control (the receiver signaling the power level and any parameters to be adapted to the transmitter), as used in conventional solutions, may not be applicable for several reasons, e.g. because the SCCs shall be of low complexity and a control channel from SCC (one or more radio units 120) to Hub (e.g. a base band unit 110 as introduced in the description of FIG. 1) may not be feasible, while a (low effort) control channel from the hub to the SCC may be permissible or even necessary. Furthermore, SCCs being stationary positioned may enable omitting closed loop power control.

Embodiments may determine how to set the transmit power levels (fronthaul transmission (TX) amplifier adaptation) of the hub overall, the hub per antenna (as usual in MIMO applications), per radio unit (e.g. the infrastructure element SCC), and the transmission power from SCC to hub—which may be one of the main contributors of the power consumption of the SCCs.

In an FDD fronthaul MMIMO system, a channel estimation phase may be used. The system may consist of a MMIMO hub (e.g. at the base band unit 110) with M antennas, and K small cells (e.g. the one or more radio units 120), here called small cell cubes SCC, that may be multibeam fronthauled via the MMIMO hub. The channel knowledge may be acquired in a training phase. The fronthaul link denotes the link between the hub (base band unit) and the SCCs (one or more radio units) of the base station transceiver.

First, the K SCCs may be brought into a loop-back (loop-the-loop) mode at one point of time, thus simply reflecting the signal it receives from the hub. The hub may transmit a training sequence (e.g. a reference signal as described subsequently) which may be reflected by the SCC and received by the hub. From this training sequence (which is affected by the uplink and downlink channel (e.g. on different frequencies of the FDD)), the UpLink (UL) and/or DownLink (DL) channel matrices may be estimated (e.g. by first deriving the M×M matrix from the training sequence correlations, and then estimating the relative uplink matrix, thus defining the downlink matrix up to an overall phase term). Conventional systems may overlay the SCCs in an orthogonal way for UL matrix estimation, which requires additional effort on SCC side (e.g. some sort of orthogonalization of the signal, e.g. multiplication with a Walsh code in the analog domain).

Now the transmit power of the hub (e. g. overall, per radio unit, per antenna) and the SCCs may be adapted according to different conditions, with variations mainly driven by the fronthaul path loss of the particular different SCC locations.

The basic idea of embodiments may cope with an acquisition of the data necessary for power control, processing of the data to derive transmission control information, and procedures to apply this transmission control information to the system.

At least some embodiments may perform:
Loop-the-loop calibration/training measurement between hub and SCCs. e.g. sequentially
FDD joint UL/DL channel matrix estimation, as briefly described above Deriving/estimating initial hub transmit power, SCCs transmit powers and the RF hardware parameters (e. g. gains) may act as transmission control information Calculate path loss from the derived UL/DL channel matrices, assuming same path loss in UL and DL:

$$PL = \frac{PL_{U/D}}{2} = \frac{PL_U + PL_D}{2}$$

Estimate the downlink SINRs based on the path loss (e.g. using additional system knowledge/estimates of noise and interference)

Calculate a required transmit power of the hub for the beam to radio unit i based on the SINR—thus equalizing the SINRs at the SCCs. As will be described in more detail later, the hub transmit power may be adapted per radio unit in the digital and analog domain.

Employ the new hub transmit power setting (adapt digital and analog transmit power values jointly).

From the uplink path loss (which may be similar to the downlink path loss) and the known transmit power of the SCC, with the known noise and interference of the hub, the required transmit power of the particular SCC to the hub may be calculated. This parameter may be verified by evaluating the actual received signal of the hub in the data but especially in the training phase where there is no beamforming gain.

Employ the new SCCs transmit power settings (e.g. by using a low effort signaling/training frame to the SCCs) to the at least required SCC transmit power necessary to keep the SCC to hub fronthaul connection. In order to save energy and support e.g. energy autarkic operation of the SCC, especially adapting the TX power amplifier transmit power and thus power consumption (e.g. by supply-voltage adaptation) may be enabled. Contrary to hub power adaptation, SCC fronthaul transmit power reduction may affect only the fronthaul link of the particular SCC which is adapted.

Taking cell planning of the deployed SCC into account, also SCC access TX power (SCC cell sizes) and thus power consumption of the access TX power amplifier may be adapted, which may also have effect on SCC overall power consumption. This might either be done predefined manually when deploying the SCCs or also adaptively later on in the field by use of adequate signaling during the loop-the-loop calibration phase. TX access power adaptation might e.g. be done more rarely (e.g. at deployment, night-day, etc.) compared to fronthaul power adaptation.

Figure 2:
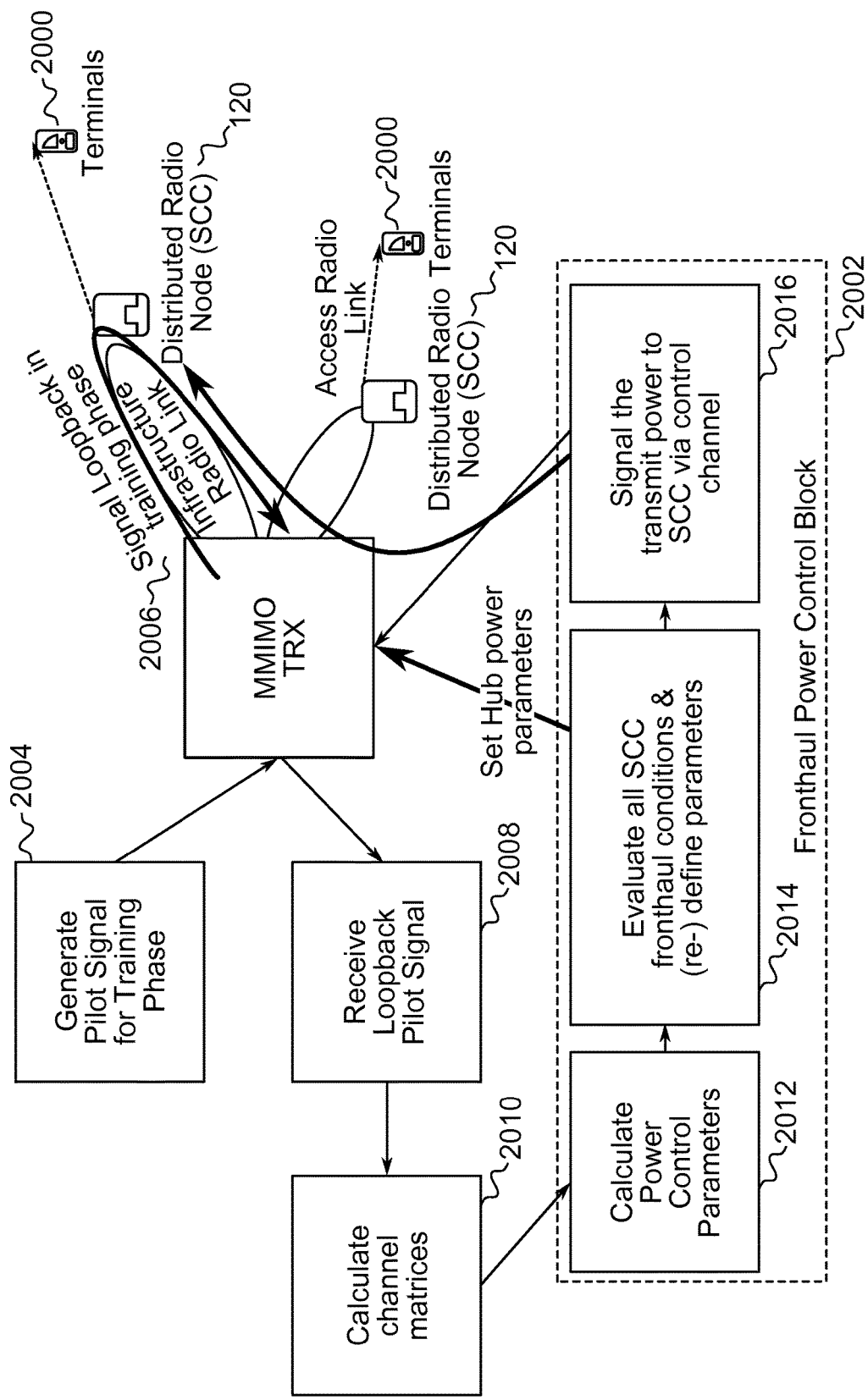
FIG. 2 illustrates a control mechanism for power control of a wireless fronthaul link.

Embodiments may employ a control mechanism for power control of the wireless fronthaul link. In FIG. 2, the dotted box 2002 shows the components of the power control that may be added to the systems functionality. A pilot signal (e.g. a reference signal as introduced subsequently) is generated 2004 and transmitted by a MMIMO Transceiver 2006 (TRX, e.g. the base band unit 110) to the SCCs (e.g. the one or more radio units 120), which serve mobile transceivers/terminals 2000. The SCCs (or distributed radio units, or one or more radio units) loopback the pilot signal to the MMIMO transceiver 2006. The uplink/downlink matrix calculation 2010 may use the loopback version of the pilot signal and may be calculated in the base band unit (e.g. in a control module 16 of the base band unit 110), and the power control may rely on these data to calculate the power control parameters (thus, the hubs per radio unit transmit power $$P_{tx_{hub_i}},$$

which may correspond to a transmission power to be used by an output 12, and the individual SCCs transmit power $$P_{tx_{c_i}},$$

which may correspond to a per-radio unit transmission power as introduced subsequently). After the calculation 2012 of these values and subsequent method for selecting 2014 the appropriate hub and SCC power levels (which may ensure, that all SCCs are connected, as described by method above), the base band unit parameters (e.g. analog gain/attenuator value), the determined appropriate pre-coding matrix" per-radio unit power scaling matrix, may be set in the base band unit, and the power scaling coefficients for each SCCs may be transmitted 2016 to each respective SCC 120. This may be done via explicit signaling of the value in a downlink control channel—e. g. an already existing channel that is used for training phase signaling for the SCCs, e.g. a downlink component of a wireless fronthaul link as introduced subsequently.

FIG. 1 illustrates a block diagram of an embodiment of an apparatus 10 for a base band unit 110 of a base station transceiver 100 of a mobile communication system 300. The base station transceiver 100 further comprises one or more radio units 120 configured to wirelessly communicate with the base band unit 110 using one or more wireless fronthaul links.

A base station transceiver, e.g. the base station transceiver 100, can be operable to communicate with one or more active mobile transceivers and a base station transceiver can be located in, overlapping to, or adjacent to a coverage area of another base station transceiver, e.g. a macro cell base station transceiver or small cell base station transceiver.

Hence, embodiments may provide a mobile communication system comprising one or more mobile transceivers and one or more base station transceivers, wherein the base station transceivers may establish macro cells or small cells, as e.g. pico-, metro-, or femto cells and a kind of frequency shifters or repeaters. A mobile transceiver may correspond to a smartphone, a cell phone, user equipment, radio equipment, a mobile, a mobile station, a laptop, a notebook, a personal computer, a Personal Digital Assistant (PDA), a Universal Serial Bus (USB)-stick, a car, a mobile relay transceiver for D2D communication, etc. A mobile transceiver may also be referred to as User Equipment (UE) or mobile in line with the 3GPP terminology.

A base station transceiver, e.g. the base station transceiver 100, can be located in the fixed or stationary part of the network or system. A base station transceiver may comprise a base band unit 110, which may correspond to a macro cell, and one or more radio units 120, which may correspond to a remote radio head, a transmission point, an access point, radio equipment, a small cell, a micro cell, a femto cell, a metro cell etc. A base station transceiver may correspond to a base station understood as a logical concept of a node/entity terminating a radio bearer or connectivity over the air interface between a terminal/mobile transceiver and a radio access network. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a eNodeB, a Base Transceiver Station (BTS) etc., which may be further subdivided in a radio unit and a base band unit. A radio unit may comprise a phase shifter or repeater for the signals provided and/or processed by the base band unit.

A mobile transceiver can be associated, camped on, or registered with a base station transceiver or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

In general, the mobile communication system 300 may, for example, correspond to one of the Third Generation Partnership Project (3GPP)-standardized mobile communication networks, where the term mobile communication system is used synonymously to mobile communication network. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In at least some embodiments, the one or more wireless fronthaul links may correspond to wireless data connections between the base band unit 110 and the one or more radio units 120. The wireless fronthaul links might be signal agnostic or analog, meaning that they may comprise the radio unit access signal shifted into the analog domain, on a different carrier frequency, e.g. by the one or more radio units 120. Some connections may potentially use sharp beam forming or rely on coherent superposition (e.g. massive MIMO) to deliver the respective signal to the respective radio unit.

The wireless fronthaul links may, e.g., be implemented using Frequency Division Duplex (FDD) or Time Division Duplex (TDD). They may comprise a downlink component from the base band unit 110 to the one or more radio units 120, and an uplink component from the one or more radio units 120 to the base band unit 110. In an FDD implementation, the uplink component and the downlink component may be based on different carrier frequencies. In a TDD implementation, the uplink component and the downlink component may use different time resources on the same carrier frequency. Due to reciprocity, channel estimation in the TDD mode can be carried out for one direction and used for the other. Reciprocity applies if the switching time of the TDD mode is equal or shorter than the coherence time of the radio channel.

The apparatus 10 comprises at least one output 12 configured to transmit a downlink component of the one or more wireless fronthaul links to the one or more radio units 120.

An output, e.g. the at least one output 12 or at least one output 24 as introduced subsequently, may correspond to an interface for transmitting information, which may be represented by digital (bit) values according to a specified code or protocol, within a module, between modules, or between modules of different entities. In at least some embodiments, the at least one output 12; 24 may comprise a, correspond to a, or communicate via a Massive MIMO (MMIMO) module, which may comprise an antenna array.

The apparatus 10 further comprises at least one input 14 configured to receive an uplink component of the one or more wireless fronthaul links from the one or more radio units 120. An input, e.g. the at least one input 14 or at least one input 22 as will be introduced subsequently, may correspond to an interface for receiving information, which may be in digital (bit) values according to a specified code, within a module, between modules or between modules of different entities. In at least some embodiments, the at least one input 14; 22 may comprise a, correspond to a, or communicate via a Massive MIMO (MMIMO) module, which may comprise an antenna array.

The apparatus 10 further comprises a control module 16 configured to control the at least one output 12 and the at least one input 14. The control module 16 is further configured to transmit a reference signal via the at least one output 12 to the one or more radio units 120. In at least some embodiments, the reference signal may comprise a sequence of known, pre-determined or identifiable symbols of known amplitude, which may be used to identify an impulse response of a channel to determine characteristics of a (wireless) channel, e.g. the wireless channels of the one or more wireless fronthaul links.

The control module 16 is further configured to receive a loopback version of the reference signal via the at least one input 14 from the one or more radio units 120. The loopback version of the reference signal may e.g. correspond to an analog conversion of the reference signal received at the one or more radio units. The loopback version of the reference signal may e.g. correspond to an analogously converted (e.g. frequency shifted) version of the loopback signal. It may further reflect the influence of the downlink component and the uplink component on the reference signal, e.g. the attenuation of the reference signal as seen in the loopback version of the reference signal. The loopback version of the reference signal may e.g. correspond to a reflected or looped back version of the reference signal (e.g. loop-the-loop).

The control module 16 is further configured determine information related to a per-radio unit transmission power to be used by the one or more radio units 120 for transmissions on the one or more wireless fronthaul links using an attenuation of the reference signal determined based on the loopback version of the reference signal. The control module 16 is further configured to determine transmission control information comprising the information related to the per-radio unit transmission power. In at least some embodiments, the transmission control information may comprise information related to an adjustment of amplifiers of the one or more radio units to achieve the per-radio unit transmission power, e.g. supply voltages. This may increase power efficiency as amplifiers may operate at increased or peak efficiency. In an exemplary implementation, the control module 16 may be configured to look up information related to the adjustment of the amplifiers based on the determined per-radio unit transmission power. The information related to the adjustment of the amplifiers may further be based on variations of the amplification of the amplifiers caused by variations of the amplifier supply voltage.

The control module 16 may e.g. be configured to determine the transmission control information based on a path loss of the downlink component and based on a path loss of the uplink component in the loopback version of the reference signal. The control module 16 may e.g. be configured to determine the per-radio unit transmission power based on an estimated interference and an estimated path loss. The control module 16 may be configured to estimate the path loss based on the reference signal and the loopback version of the reference signal. The control module 16 may e.g. use the amplitude of the received loopback version of the reference signal and compare it with the original amplitude of the reference signal to calculate or deduce an attenuation/the path loss.

In an exemplary implementation, the control module 16 may be configured to determine the per-radio unit transmission power based on an optimization function. The control module 16 may e.g. be configured to determine the per-radio unit transmission power such, that a target Signal-to-Interference and Noise, SINR, for the uplink component is approximated based on $$SINR_{target,u} = P_{tx_{c_i}} - PL_{u_i} - P_{IF,z,NF}.$$

$SINR_{target,u}$ denotes the target SINR for the uplink component, $P_{tx_{c_i}}$ denotes the per-radio unit transmission power of a radio unit i of the one or more radio units 120, and $PL_{u_i}$ is the estimated path loss of the uplink component of the radio unit i. $P_{IF,z,NF}$ may e.g. be based on an interference power (IF), a thermal noise (z), and a receive noise figure (NF), of the uplink component.

In various embodiments, the control module 16 may be configured to determine an uplink channel estimation matrix and a downlink channel estimation matrix based on the reference signal and the loopback version of the reference signal to determine the transmission control information. Alternatively or additionally, wherein the control module 16 may be configured to determine a joint uplink/downlink channel estimation matrix based on the reference signal and the loopback version of the reference signal to determine the transmission control information.

In various embodiments, the control module 16 may be further configured to determine the transmission control information based on a cell coverage plan of the one or more radio units 120. The control module 16 may e.g. be configured to calculate an estimated per-radio unit transmission power based on e.g. distances of the one or more radio units 120 to the base band unit 110 based on the cell coverage plan, and may adjust the estimated per-radio unit transmission power based on the reference signal and the loopback version of the reference signal.

In a preferred embodiment, the control module 16 may be configured to determine the transmission control information without using information related to a channel estimation of the one or more wireless fronthaul links carried out at the one or more radio units 120. The control module 16 may e.g. be configured to determine the transmission control information for the one or more radio units 120, while the one or more radio units 120 merely loopback (and e.g. frequency shift) the reference signal.

In at least some embodiments, the control module 16 may be configured to determine information related to a quality of the received uplink component. The control module 16 may be configured to adjust the transmission control information based on the information related to the quality of the received uplink component. The control module 16 may e.g. be configured to compare an outcome of the previously determined transmission control information to a desired outcome, e.g. a desired SINR, e.g. by analyzing the received uplink component, and may accordingly adjust the transmission control information, e.g. the per-radio unit transmission power, to achieve the desired outcome.

In at least some embodiments, the transmission control information may comprise information related to a power threshold for a transmission of the one or more wireless fronthaul links. The information related to the power threshold may correspond to a projected lower bound for the per-radio unit transmission power based on a desired metric, e.g. a desired SINR or receive power.

The control module 16 is further configured to provide the transmission control information to the one or more radio units 120 via the at least one output 12. The control module 16 may e.g. provide the transmission control information to the one or more radio units 120 using a control channel comprised in the one or more wireless fronthaul links, the transmission control information may be comprised in payload data or between payload data, or it may be transported using a further control channel.

In embodiments the control module 16, and a control module 26 as introduced subsequently, may be implemented using one or more processing units, one or more processing devices, any means for processing, such as a processor, a computer or a programmable hardware component being operable with accordingly adapted software. In other words, the described function of the control module 16; 26 may as well be implemented in software, which is then executed on one or more programmable hardware components. Such hardware components may comprise a general purpose processor, a Digital Signal Processor (DSP), a micro-controller, etc.

In at least some embodiments, the control module 16 may be further configured to determine information related to a transmission power to be used by the at least one output 12 for transmissions on the one or more wireless fronthaul links based on the reference signal and the loopback version of the reference signal. The control module 16 may be further configured to adapt the transmitting of the downlink component of the one or more wireless fronthaul signals at the at least one output 12 based on the information related to a transmission power to be used on the at least one output 12.

The control module 16 may e.g. be configured to adjust the transmission power used by the at least one output 12 to achieve a desired SINR or receive power of the one or more wireless fronthaul links at the one or more radio units 120. In various embodiments, the adaptation of the transmitting may comprise an adaptation of a weighting of per-radio unit sub-antenna components or hardware-level adjustments, e.g. an adjustment of attenuators of the transmission component. In at least some embodiments, the supply voltage, e.g. of amplifiers, may be reduced, e.g. in order to operate amplifiers with an increased efficiency, instead of operating with increased backoff (and reduced efficiency). In at least some embodiments, the adaptation of the transmitting may further comprise a deactivation of antenna components or paths (in case radio units are deactivated or an overall required transmission power is reduced). The active antenna components and paths may operate with increased efficiency, as a power consumption of conversion units of deactivated paths may be omitted. As a number of antenna components or sub-antennas is thereby reduced, an impact of the reduction may be further calculated and compared to the requirements.

In various embodiments, the control module 16 may be configured to determine the transmission power to be used by the at least one output 12 for transmissions on the one or more wireless fronthaul links based on an optimization function. The control module 16 may e.g. be configured to determine the transmission power to be used by the at least one output 12 such, that a target Signal-to-Interference and Noise, SINR, for the downlink component is approximated based on $$SINR_{target,d} = P_{tx_{hub_i}} - PL_{d_i} - P_{IF,z,NF}.$$

$SINR_{target,d}$ is the target SINR for the downlink component, $$P_{tx_{hub_i}}$$

is the transmission power to be used by the at least one output 12 for transmissions to a radio unit i of the one or more radio units 120, and $PL_{d_i}$ is the estimated path loss of the downlink component for transmissions to the radio unit i. $P_{IF,z,NF}$ may be based on an interference power (IF), a thermal noise (z), and a receive noise figure (NF) of the downlink component.

In various embodiments, the control module 16 may be further configured to determine information related to a subset of antenna elements of a plurality of antenna elements to be used for transmitting on the one or more wireless fronthaul links. The information related to the transmission power to be used by the at least one output 12 for transmissions on the one or more wireless fronthaul links comprises the information related to the subset of antenna elements. The plurality of antenna elements may e.g. be comprised in a Multiple Input Multiple Output (MIMO) antenna module, and may e.g. be used for Massive MIMO, e.g. MIMO with a vast plurality of antenna elements. The plurality of antenna elements may e.g. be used for beamforming, and the one or more wireless fronthaul links may be spatially separated by such beamforming. The subset of antenna elements may e.g. correspond to the antenna elements to be used to maintain currently active wireless fronthaul links of the one or more wireless fronthaul links. The control module 16 may be configured to reduce a number of antenna elements in the subset to further decrease an energy consumption or demand of the antenna module, e.g. by deactivating associated conversion units, while maintaining currently active wireless fronthaul links.

In at least some embodiments, the control module 16 may be further configured to adapt the receiving of the uplink component of the one or more wireless fronthaul signals at the at least one input 14 based on the reference signal and the loopback version of the reference signal. The control module 16 may e.g. be configured to adjust an equalization of the received uplink component based on the reference signal and the loopback version of the reference signal, e.g. to account for distortion caused by transmission.

Figure 3:
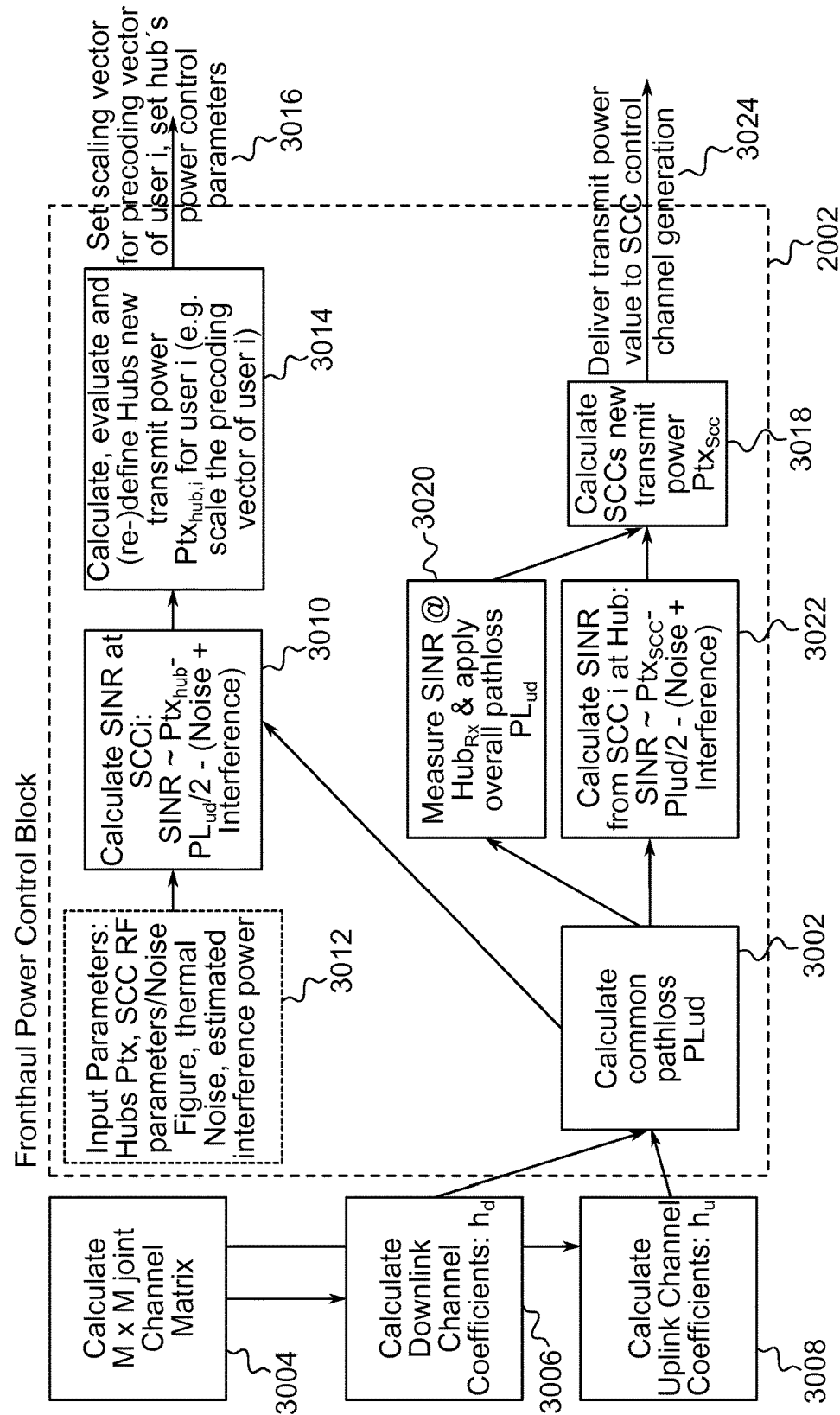
FIG. 3 illustrates a processing flow of the wireless fronthaul links' power control of various embodiments.

FIG. 3 illustrates a processing flow of the wireless fronthaul links' power control for various embodiments. In an exemplary embodiment, the calculation of the transmit power of the hub antennas and the transmit power of the SCCs may comprise:

Estimating a path loss (PL) 3002 to radio units (e.g. the one or more radio units 120) (approx. equal path loss in uplink ($PL_u$) and downlink ($PL_d$) might be assumed, e.g.

$$PL = \frac{PL_{ud}}{2} = PL_u = PL_d).$$

The path loss may be estimated from the transmit power $P_{tx_{hub}}$ at the hubs (e.g. base band unit 110) antennas, and the receive power from radio unit i, $P_{rx_i}$, at the Hub. $P_{rx_i}$ may be estimated from the receive signal per antenna or from an M×M matrix gained within the training phase per radio unit i or the thereof derived uplink and downlink channel coefficient matrices $h_u$, $h_d$. FIG. 3 further shows calculating the M×M joint channel matrix 3004, calculating the downlink channel coefficients $h_d$ 3006 and calculating the uplink channel coefficients $h_u$ 3008.

For each radio unit, an SINR of at least $SINR_{min}$ may be achieved. The transmission power may be adapted in a way such that an overachievement of the SINR requirement may be limited. The transmit power necessary per radio unit may vary over the path loss, which may in turn vary mainly over the distance to the hub. The transmit power may also vary over the number of served radio units, so that in case of power down of radio units the hub's transmit power can be reduced.

The path loss to radio unit i is denoted $PL_{d_i}$, the transmission power portion—including array/transmission scheme gain—transmitted in the signal to radio unit i is $$P_{tx_{hub_i}}$$

(e.g. at first an equal split might be assumed $$P_{tx_{hub_i}} = \frac{1}{K} \cdot P_{tx_{hub}}).$$

The receive power and SINR from hub at SCC i might be estimated 3010 using:

$$P_{rx_{d_i}} = P_{tx_{hub_i}} - PL_{d_i}.$$

The SINR may be estimated 3010 in several ways, depending on the system. Assuming no interference from other radio units (e. g. perfect zero-forcing), the SINR may be dependent 3012 on thermal noise (z), RX noise figure (NF) and interference power ($P_{IF}$), e. g. from adjacent bands (45 dB Adjacent Channel Leakage Power Ratio (ACLR) at a given power level):

$$P_{rx_{d_i}} - P_{IF,y,NF} = SINR$$

This SINR estimate may be used to calculate a lower boundary for a hub transmission power estimate $$P_{tx_{hub_{i_{min}}}}.$$

This estimate may then be put to test 3014 (with a margin) in the system or in an additional training phase for validation, or an indicator to the access link quality can be used as metric for detection of link failures in such a system. Further adaptations in small steps as a control loop are possible afterwards, if necessary.

Figure 4:
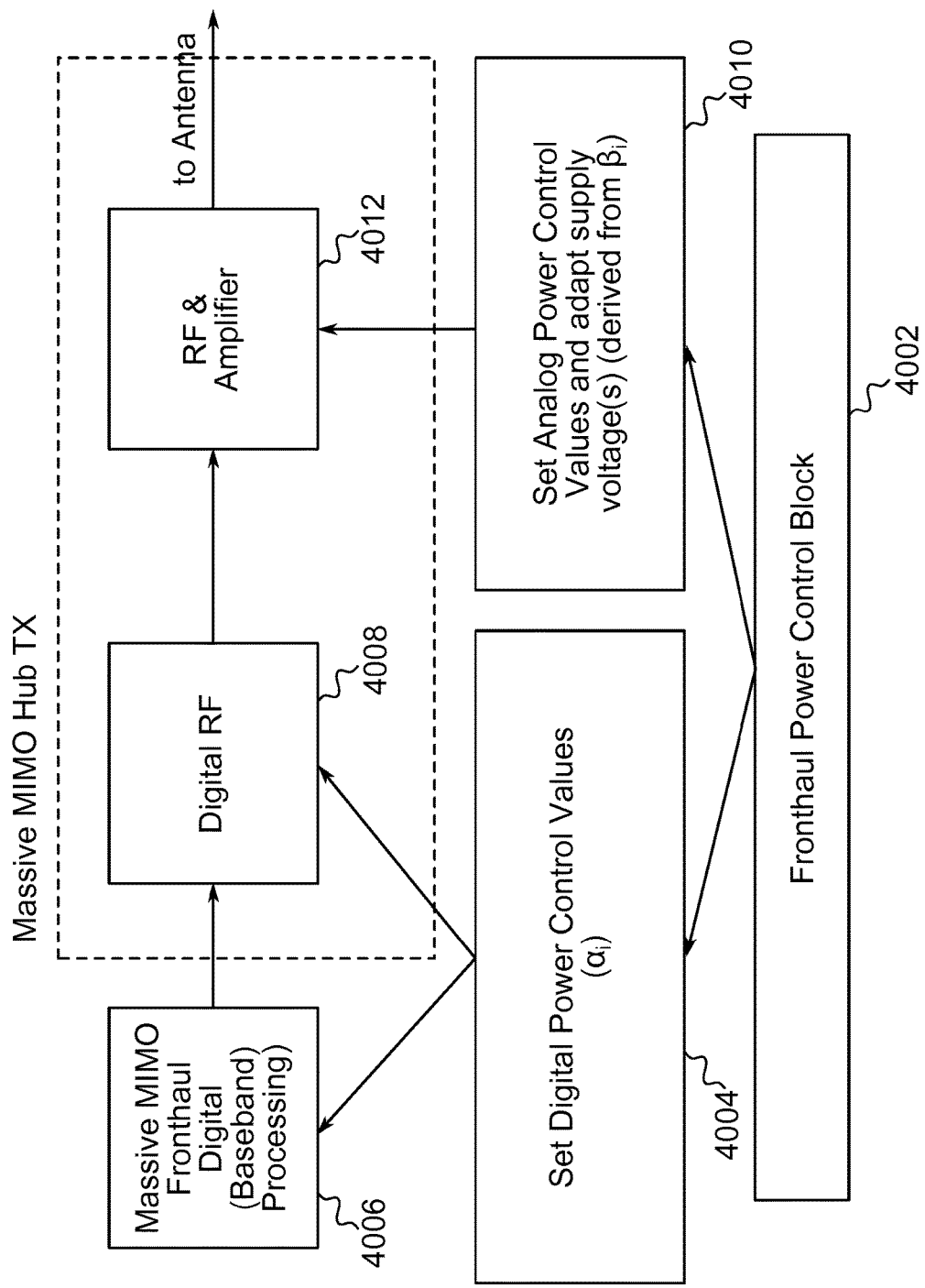
FIG. 4 illustrates an adaptation of the transmission power of at least some embodiments.

As described below, the actual adaption 3016 of the transmit power of the hub (overall per-radio unit power control) may be done e. g. in two ways: an analog signal scaling within the dynamic range of the transmitter (per radio unit, also jointly with the per antenna power adaption), and by an adaption of the analog per-antenna powers (FIG. 4) using amplifier supply voltages or attenuator values at the amplifier input for example. The condition of the power control might be expressed as $$\sum_{j=1}^{K}\left(\frac{\alpha_j}{K} \cdot \sum_{i=1}^{M}\left(\beta_i \cdot P_{tx_{hub_{ant_{max},i}}}\right)\right) \leq P_{tx_{hub_{max},i}}$$

with $\alpha_j$ being the individual digital scaling factors, $\beta_i$ being the individual analog antenna/RF Tx scaling factors, $$P_{tx_{hub_{ant_{max},i}}}$$

being an upper transmit power per antenna, and $$P_{tx_{hub_{max},i}}$$

being an upper RF overall transmit power for which the RF part is designed (which may be defined by an amplifier's peak power minus signal backoff). A fronthaul power control block 4002, which may be comprised in the control module 16, may set 4004 the digital power control values $\alpha_j$ to adapt MMIMO Fronthaul Digital (Baseband) Processing 4006 and Digital RF processing 4008, and to set 4010 the analog power control values and adapt supply voltages based on $\beta_i$ to adjust the analog RF processing and the amplifier 4012, which feed the signal to an antenna.

Embodiments may use several ways of adapting these values. A first exemplary implementation may calculate the required average sum transmit power of the hub from the calculated SINR/path loss values of all SCCs (e.g. radio units 120) as described. Then $\beta_i=\beta$ may be set commonly to a lower acceptable value to achieve this power. In a next step, the per-antenna power control may be fine-tuned using the $\alpha_i$ values to accommodate power distribution between the SCCs.

Likewise, a lower transmit power of the radio units to the hub may be calculated 3018. Taking the estimated uplink path loss from radio unit i: $PL_{u_i}=PL_i$, the known initial transmit power of the radio unit i $$P_{tx_{c_i}},$$

a required transmit power for the target SINR may be calculated with respect to the expected interference and noise, NF at the hub receiver $$P_{IF_{N_{hub}}}.$$

The actual uplink transmit power of the SCCs at the hub might also be measured 3020 and the SINR at the hub receiver may be calculated 3022 (preferably in the training phase), e.g. by employing the overall path loss estimate $PL_{ud}$ and the known transmit power of the hub $P_{tx_{hub}}$. The resulting per-radio unit transmission power may be then be provided 3024 to the radio units.

In an exemplary implementation, the overall path loss might be calculated 3002 from the channel matrix as:

$PL_{ud}=\|H\|^2$, with $\|.\|$ being the Frobenius norm.

For example, after taking a Singular Value Disposition (SVD) of the M×M joint UL/DL channel matrix of the system and deriving the UL, DL M×K, K×M matrices for radio unit i: $hu_i$, $hd_i$, the path loss may be calculated from the individual matrices: $PL_{ud_i}=\|hu_i\|^2+\|hd_i\|^2$.

In general, the expected SINRs may be calculated 3010, 3022 as:

$$SINR = \frac{P_{tx}}{\text{thermal noise} + \text{interference estimates}} \cdot \frac{PL_{ud}}{2}.$$

(with $P_{tx}$ being either the transmit power of a hub antenna or the SCC, and the noise+interference and RF chain influence from the respective link and receiver type, with the path loss assumed to be approximately equal in UL and DL). The known noise figure of the receive chain may be considered in the SINR calculation.

The per-radio unit transmission power (e. g. the power in the beam to radio unit i) may be calculated 3018 as:

Let X=G×s be the M×1 matrix of the transmit signals of each of the M individual array antennas, with G being the M×K precoding matrix, and s being the K×1 signal vector of transmit symbols (with E[ss*]=1) to the K small cells.

The per-radio unit transmission power can be expressed as (and thus apply a power scaling coefficient(s)) as:

$E[(G^{T_i} \cdot s_i) \times (G^{T_i} \cdot s_i)^*] = E[(G^{T_i}) \times (G^{T_i})^*] = P_i$ (power constraint for radio unit i), with $G_1$ being the K×1 matrix of precoding coefficients for radio unit i (e. g. column elements $[g_{1,i} \ldots g_{M,i}]$ of the matrix G).

A per-antenna power constraint: $E[X_m \times X_m] \leq P_{tx}$, may be used as well ($P_{tx_m}$ being the power constraint on antenna m).

The per-radio unit transmission power might be adapted using:

$$P_{rx_i} = \frac{\alpha}{K \cdot \sum_{n=1}^{M} P_{tx_{hub_n}}} + \text{Gain} - PL$$

Here, is $$\frac{\alpha}{K}$$

the digital power scaling factor for radio unit K, with $$\sum_{n=1}^{M} P_{tx_{hub_n}} = P_{tx_{hub}}$$

This may allow to distribute the overall hub transmit power $$\sum_{i=1}^{K} \frac{\alpha_i}{K} = 1.$$

non-uniformly over the K SCCs. If it appears that the maximum hub transmit power required to fronthaul all SCCs is exceeding the actual maximum transmit power of the hub, an adequate decision which SCCs are supported and which may be disconnected may be done. Such a decision may e.g. be based on current load of the respective SCCs, or based on a known load over time profile, or e.g. if disconnecting a single SCC would allow to fronthaul two or more SCCs, which else wise would not be connected.

The term:

$$\sum_{i=1}^{K} \left( \frac{\alpha_i}{K} \cdot \sum_{n=1}^{M} P_{tx_{hub_n}} \right) \leq P_{tx_{hub}}$$

may be adjusted or enhanced by adapting the digital power scaling factors $\alpha_i$ and the actual analog per-antenna transmit powers $$P_{tx_{hub_n}}$$

jointly. The per-antenna transmit powers $$P_{tx_{hub_n}}$$

may be seen as power controlled versions of the upper per-antenna powers $$P_{tx_{hub_n}} = \beta_n \cdot P_{tx_{hub_n,max}},$$

The analog power control factor β≤1 might be different per antenna (thus per RF path, amplifier, attenuator):

$$P_{tx_{hub_{n,max}}} : P_{tx_{hub_n}} = \beta \cdot P_{tx_{hub_{n,max}}}.$$

e. g. to accommodate effects like shadowing in the hub. In order to achieve the wanted energy enhancement of the Hub and also for the SCC, adjusting the analog power control factor β may also comprise a suitable adaptation of e.g. the supply voltage and thus power consumption of the respective transmit power amplifiers.

The transmit power adaptation and thus power consumption adaptation in the hub as well as in the SCC may be done in context with the loop-the-loop calibration, which may be done e.g. in a ms timeframe, power amplifier supply voltage adaptation might be done "relatively—not signal envelope bandwidth based", e.g. by switching between different pre-defined supply voltages. This may be implemented into the single hub antenna elements as well as into the particular SCC. While transmit power related power amplifier supply voltage adaptation may be directly controlled for the hub by the related digital control platform, for the SCC it might either be manually adjusted (e.g. possible based on info, where the SCC are located and based on related calibration measurements) or adaptively by adequate hub-SCC signaling and electrical adjustment in the SCC e.g. based on the signaling.

The at least one output 12 and the at least one input 14 are coupled to the control module 16.

Figure 5:
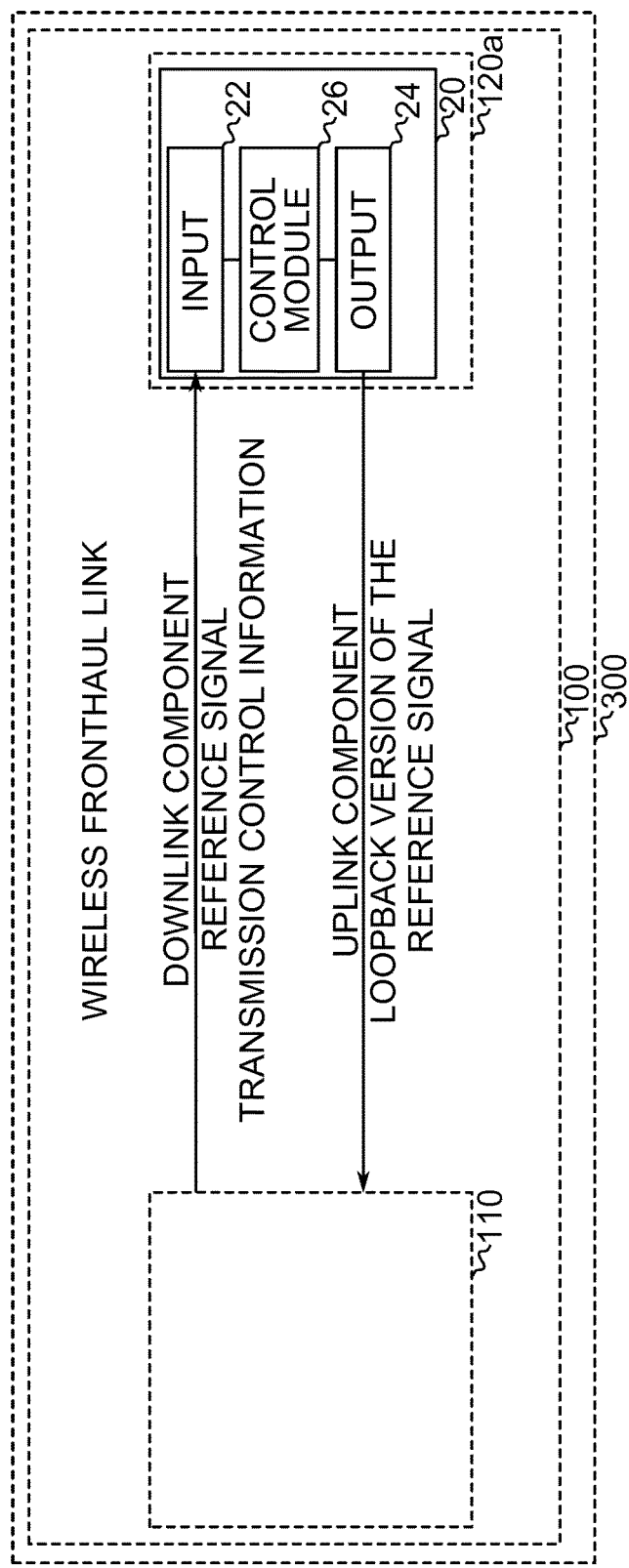
FIG. 5 illustrates a block diagram of an embodiment of an apparatus 20 for a radio unit 120a of a base station transceiver 100 of a mobile communication system.

FIG. 5 illustrates a block diagram of an embodiment of an apparatus 20 for a radio unit 120*a* of a base station transceiver 100 of a mobile communication system 300. The base station transceiver 100 further comprises a base band unit 110 wirelessly communicating with the radio unit 120*a* using a wireless fronthaul link. The apparatus 20 comprises at least one input 22 configured to receive a downlink component of the wireless fronthaul link from the base band unit 110. The apparatus 20 further comprises at least one output 24 configured to transmit an uplink component of the wireless fronthaul links to the base band unit 110. The one or more radio units 120 as introduced in FIG. 1-4 may comprise the radio unit 120*a*.

The apparatus 20 further comprises a control module 26 configured to control the at least one input 22 and the at least one output 24. The control module 26 is further configured to receive a reference signal via the at least one input 22 from the base band unit 110.

The control module 26 is further configured to loopback a loopback version of the received reference signal via the at least one output 24 to the base band unit 110. The control module 26 may e.g. be configured to determine the loopback version of the received reference signal by analogously converting the received reference signal. The downlink component may e.g. use a downlink carrier frequency and the uplink component may use an uplink carrier frequency. The control module 26 may be configured to determine the loopback version of the received reference signal by analogously converting the received reference signal from the downlink carrier frequency to the uplink carrier frequency, e.g. via the base band. In at least some embodiments, the loopback may correspond to a retransmission of the received reference signal, a frequency-shifted retransmission of the received reference signal, a time-delayed retransmission of the received reference signal, a reflection of the received reference signal, a frequency-shifted reflection of the received reference signal, or a time-delayed reflection of the received reference signal.

Alternatively or additionally, the downlink component and the uplink component may use the same carrier frequency, and the control module 26 may be configured to re-transmit the received reference signal as loopback version after a delay, e.g. using a delay module to temporarily store the received reference signal.

In at least some embodiments, the control module 16 may be configured to transmit the reference signal using a carrier frequency of the uplink component and using a carrier frequency of the downlink component. The control module 26 may be configured to re-transmit the received reference signals on the carrier frequency of the uplink component and the carrier frequency of the downlink component as loopback version after a delay. The loopback version may comprise loopback versions of the reference signals on the carrier frequency of the uplink component and on the carrier frequency of the downlink component. In at least some embodiments, the control module 26 may be configured to re-transmit the reference signal received on the carrier frequency of the uplink component using the carrier frequency of the uplink component, and to re-transmit the reference signal received on the carrier frequency of the downlink component using the carrier frequency of the downlink component. The at least one input 14 may be configured to receive the loopback version of the reference signal on the carrier frequency of the uplink component and on the carrier frequency of the downlink component. In at least some embodiments, the control module 16 may be configured to determine the information related to the per-radio unit transmission power to be used by the one or more radio units 120 for transmissions on the one or more wireless fronthaul links based on an attenuation of the reference signal on the carrier frequency of the uplink component using the loopback version of the reference signal received on the carrier frequency of the uplink component. In at least some embodiments, the control module 16 may be configured to determine the information related to the transmission power to be used by the at least one output 12 for transmissions on the one or more wireless fronthaul links based on an attenuation of the reference signal on the carrier frequency of the downlink component using the loopback version of the reference signal received on the carrier frequency of the downlink component.

In an exemplary embodiment, the at least one output may comprise a switch to switch between frequency bands to use for transmissions, and a multi-band power amplifier, to enable the at least one output 24 to transmit alternatively on the frequency bands of the uplink component and the downlink component. In an exemplary implementation, the at least one input 14 may comprise a switch to switch the frequency bands used for receiving signals between the frequency bands of the uplink component and the downlink component, and may accordingly comprise a multi-band low-noise amplifier and multi-band filter module for the frequency bands of the uplink component and the downlink component. The received loopback version of the reference signal on the carrier frequency of the uplink component and on the carrier frequency of the downlink component may indicate an attenuation of the reference signal on the frequencies used by the downlink component and the uplink component.

The control module 26 is further configured to receive transmission control information from the base band unit 110. The transmission control information comprises information related to a per-radio unit transmission power to be used by the radio unit 120*a* for transmissions on the wireless fronthaul link. The control module 26 is further configured to adapt the transmission power of the uplink component via the at least one output 24 based on the transmission control information. The control module 26 may e.g. be configured to apply an amplification or transmission power based on the per-radio unit transmission power, e.g. to achieve a desired SINR or receive power at the base band unit 120 and/or to operate amplifiers, e.g. amplifiers of the at least one output 24, at an increased or peak efficiency. In various embodiments, the adaptation of the transmission power may comprise an adaptation of a weighting of sub-antennas or hardware-level adjustments, e.g. an adjustment of attenuators of the transmission component. In at least some embodiments, the supply voltage, e.g. of amplifiers of the at least one output 24, may be reduced, e.g. in order to operate amplifiers with an increased efficiency, instead of operating with increased backoff (and reduced efficiency). In various embodiments, the control module 26 may be further configured to adjust a receiving of the at least one input 22 based on the transmission control information, e.g. by attenuating received signals. This may reduce a jamming/overdrive caused if the radio unit is close to the base band unit and the transmission power of the base band unit cannot be decreased further.

The at least one output 22 and the at least one input 44 are coupled to the control module 26.

More details and aspects of the apparatus 20 (e.g. radio unit, base band unit, mobile communication system, base station transceiver, wireless fronthaul link, downlink component, uplink component, reference signal, loopback version of the reference signal, per-radio unit transmission power) are mentioned in connection with the proposed concept or one or more examples described above (e.g. FIG. 1 to 4). The apparatus 20 may comprise one or more additional optional features corresponding to one or more aspects of the proposed concept or one or more examples described above or below.

Figure 6:
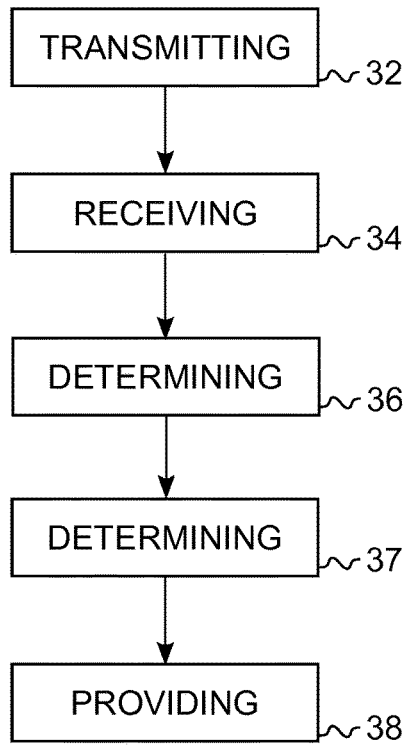
FIG. 6 illustrates a flow chart of an embodiment of method for a base band unit of a base station transceiver of a mobile communication system.

FIG. 6 illustrates a block diagram of an embodiment of method for a base band unit 110 of a base station transceiver 100 of a mobile communication system 300. The base station transceiver 100 further comprises one or more radio units 120 configured to wirelessly communicate with the base band unit 110 using one or more wireless fronthaul links. The method comprises transmitting 32 a reference signal to the one or more radio units 120. The method further comprises receiving 34 a loopback version of the reference signal from the one or more radio units 120. The method further comprises determining 36 information related to a per-radio unit transmission power to be used by the one or more radio units 120 for transmissions on the one or more wireless fronthaul links using an attenuation of the reference signal determined based on the loopback version of the reference signal. The method further comprises determining 37 transmission control information comprising the information related to the per-radio unit transmission power. The method further comprises providing 38 the transmission control information to the one or more radio units 120.

Figure 7:
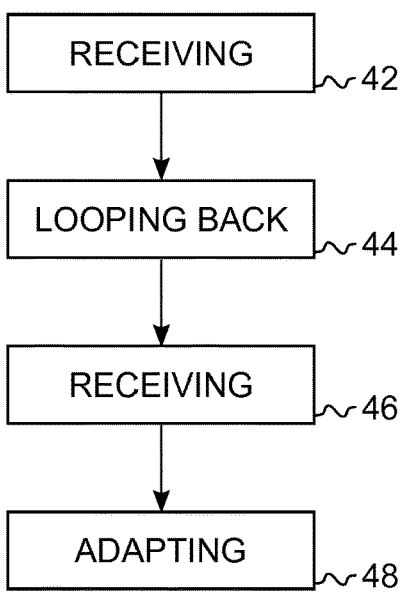
FIG. 7 illustrates a block diagram of an embodiment of method for a radio unit of a base station transceiver of a mobile communication system.

FIG. 7 illustrates a block diagram of an embodiment of method for a radio unit 120*a* of a base station transceiver 100 of a mobile communication system 300. The base station transceiver 100 further comprises a base band unit 110 wirelessly communicating with the radio unit 120*a* using a wireless fronthaul link. The method comprises receiving 42 a reference signal from the base band unit 110. The method further comprises looping back 44 a loopback version of the received reference signal to the base band unit 110. The method further comprises receiving 46 transmission control information from the base band unit 110. The transmission control information comprises information related to a per-radio unit transmission power to be used by the radio unit 120*a* for transmissions on the wireless fronthaul link. The method further comprises adapting 48 the transmission power for transmissions on the wireless fronthaul link based on the transmission control information.

Some embodiments comprise a digital control circuit installed within the apparatus for performing the method. Such a digital control circuit, e.g. a Digital Signal Processor (DSP), needs to be programmed accordingly. Hence, yet further embodiments also provide a computer program having a program code for performing embodiments of the method, when the computer program is executed on a computer, a digital processor, or a programmable hardware component. A further embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

Embodiments may provide a MMIMO hub and SCC transmit power adaptation, which may allow for an improved power consumption of hub and SCC as well as preventing that e.g. SCCs, positioned very closely to the hub with low path losses "jam" the hub and it's sensitivity for other SCCs with comparatively high path losses, and SCCs positioned very closely to the hub are not jammed themselves if a per-antenna transmission power of the hub in close proximity cannot be reduced further.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for controlling", "means for transmitting", "means for receiving", "means for transceiving", "means for processing", etc., may be provided through the use of dedicated hardware, such as "a controller", "a transmitter", "a receiver", "a transceiver", "a processor". etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

The invention claimed is:

1. An apparatus for a base band unit of a base station transceiver of a mobile communication system, the base station transceiver further comprising one or more radio units configured to wirelessly communicate with the base band unit using one or more wireless fronthaul links, the apparatus comprising:

at least one output configured to transmit a downlink component of the one or more wireless fronthaul links to the one or more radio units;

at least one input configured to receive an uplink component of the one or more wireless fronthaul links from the one or more radio units; and a control module configured to:

control the at least one output and the at least one input, transmit a reference signal via the at least one output to the one or more radio units, receive a loopback version of the reference signal via the at least one input from the one or more radio units, determine information related to a per-radio unit transmission power to be used by the one or more radio units for transmissions on the one or more wireless fronthaul links using an attenuation of the reference signal determined based on the loopback version of the reference signal, determine transmission control information comprising the information related to the per-radio unit transmission power, and provide the transmission control information to the one or more radio units via the at least one output;

wherein the control module is configured to determine the per-radio unit transmission power based on an estimated interference and an estimated path loss, wherein the control module is configured to estimate the path loss based on the reference signal and the loopback version of the reference signal; and wherein the control module is configured to determine the per-radio unit transmission power based on an optimization function, wherein the control module is configured to determine the per-radio unit transmission power such that a target Signal-to-Interference and Noise (SINR) for the uplink component is approximated based on $$SINR_{target,u} = P_{tx_{c_i}} - PL_{u_i} - P_{IF,z,NF}$$

wherein $SINR_{target,u}$ is the target SINR for the uplink component, $$P_{tx_{c_i}}$$

is the per-radio unit transmission power of a radio unit I of the one or more radio units, $PL_{u_i}$ is an estimated path loss of the uplink component of the radio unit i, and $P_{IF,z,NF}$ is based on an interference power (IF), a thermal noise (z), and a receive noise figure (NF) of the uplink component.

2. The apparatus of claim 1, wherein the loopback version of the reference signal corresponds to an analog conversion of the reference signal received at the one or more radio units, and/or wherein the control module is configured to determine the transmission control information based on a path loss of the downlink component and based on a path loss of the uplink component in the loopback version of the reference signal.

3. The apparatus of claim 1, wherein the control module is further configured to determine information related to a transmission power to be used by the at least one output for transmissions on the one or more wireless fronthaul links based on the reference signal and the loopback version of the reference signal, and to adapt the transmitting of the downlink component of one or more wireless fronthaul signals at the at least one output based on the information related to a transmission power to be used on the at least one output.

4. The apparatus of claim 3, wherein the control module is configured to determine the transmission power to be used by the at least one output for transmissions on the one or more wireless fronthaul links based on an optimization function, wherein the control module is configured to determine the transmission power to be used by the at least one output such that a target Signal-to-Interference and Noise (SINR) for the downlink component is approximated based on $$SINR_{target,d} = P_{tx_{hub_i}} - PL_{d_i} - P_{IF,z,NF}$$

wherein $SINR_{target,d}$ is the target SINR for the downlink component, $$P_{tx_{hub_i}}$$

is the transmission power to be used by the at least one output for transmissions to a radio unit i of the one or more radio units, $PL_{d_i}$ is an estimated path loss of the downlink component for transmissions to the radio unit i, and $P_{IF,z,NF}$ is based on an interference power (IF), a thermal noise (z), and a receive noise figure (NF) of the downlink component,
  and/or wherein the control module is further configured to determine information related to a subset of antenna elements of a plurality of antenna elements to be used for transmitting on the one or more wireless fronthaul links, and wherein the information related to the transmission power to be used by the at least one output for transmissions on the one or more wireless fronthaul links comprises the information related to the subset of antenna elements.

5. The apparatus of claim 1, wherein the control module is further configured to adapt the receiving of the uplink component of one or more wireless fronthaul signals at the at least one input based on the reference signal and the loopback version of the reference signal.

6. The apparatus of claim 1, wherein the control module is configured to determine an uplink channel estimation matrix and a downlink channel estimation matrix based on the reference signal and the loopback version of the reference signal to determine the transmission control information, or wherein the control module is configured to determine a joint uplink/downlink channel estimation matrix based on the reference signal and the loopback version of the reference signal to determine the transmission control information,
  and/or wherein the control module is configured to determine information related to a quality of the received uplink component and wherein the control module is configured to adjust the transmission control information based on the information related to the quality of the received uplink component.

7. The apparatus of claim 1, wherein the transmission control information comprises information related to a power threshold for a transmission of the one or more wireless fronthaul links, and/or wherein the control module is further configured to determine the transmission control information based on a cell coverage plan of the one or more radio units.

8. The apparatus of claim 1, wherein the control module is configured to determine the transmission control information without using information related to a channel estimation of the one or more wireless fronthaul links carried out at the one or more radio units.

9. An apparatus for a radio unit of a base station transceiver of a mobile communication system, the base station transceiver further comprising a base band unit configured to wirelessly communicate with the radio unit using a wireless fronthaul link, the apparatus comprising:
  at least one input configured to receive a downlink component of the wireless fronthaul link from the base band unit;
  at least one output configured to transmit an uplink component of the wireless fronthaul links to the base band unit; and
  a control module configured to:
    control the at least one input and the at least one output,
    receive a reference signal via the at least one input from the base band unit,
    loopback a loopback version of the received reference signal via the at least one output to the base band unit,
    receive transmission control information from the base band unit, wherein the transmission control information comprises information related to a per-radio unit transmission power to be used by the radio unit for transmissions on the wireless fronthaul link, and
    adapt the transmission power of the uplink component via the at least one output based on the transmission control information;
  wherein the per-radio unit transmission power is determined based on an estimated interference and an estimated path loss, wherein the estimated path loss is estimated based on the reference signal and the loopback version of the reference signal; and
  wherein the per-radio unit transmission power is determined based on an optimization function, wherein the per-radio unit transmission power is determined such that a target Signal-to-Interference and Noise (SINR) for the uplink component is approximated based on $$SINR_{target,u} = P_{tx_{c_i}} - PL_{u_i} - P_{IF,z,NF}$$

wherein $SINR_{target,u}$ is the target SINR for the uplink component, $$P_{tx_{c_i}}$$

is the per-radio unit transmission power of a radio unit i of the one or more radio units, $PL_{u_i}$ is an estimated path loss of the uplink component of the radio unit i, and $P_{IF,z,NF}$ is based on an interference power (IF), a thermal noise (z), and a receive noise figure (NF) of the uplink component.

10. The apparatus of claim 9, wherein the control module is configured to determine the loopback version of the received reference signal by analogously converting the received reference signal,
  and/or wherein the downlink component uses a downlink carrier frequency, wherein the uplink component uses an uplink carrier frequency, and wherein the control module is configured to determine the loopback version of the received reference signal by analogously converting the received reference signal from the downlink carrier frequency to the uplink carrier frequency.

11. A method for a base band unit of a base station transceiver of a mobile communication system, the base station transceiver further comprising one or more radio units configured to wirelessly communicate with the base band unit using one or more wireless fronthaul links, the method comprising:

transmitting a reference signal to the one or more radio units;

receiving a loopback version of the reference signal from the one or more radio units;

determining information related to a per-radio unit transmission power to be used by the one or more radio units for transmissions on the one or more wireless fronthaul links using an attenuation of the reference signal determined based on the loopback version of the reference signal;

determining transmission control information comprising the information related to the per-radio unit transmission power; and providing the transmission control information to the one or more radio units;

determining information related to a transmission power to be used by at least one output for transmissions on the one or more wireless fronthaul finks based on the reference signal and the loopback version of the reference signal, and adapting the transmitting of a downlink component of one or more wireless fronthaul signals at the at least one output based on the information related to a transmission power to be used on the at least one output; and wherein;

(i) the transmission power to be used by the at least one output for transmissions on the one or more wireless fronthaul links is determined based on an optimization function, wherein the transmission power to be used by the at least one output is determined such that a target Signal-to-Interference and Noise (SINR) for the downlink component is approximated based on $$SINR_{target,d} = P_{tx_{hub_i}} - PL_{d_i} - P_{IF,z,NF}$$

wherein $SINR_{target,d}$ is the target SINR for the downlink component, $$P_{tx_{hub_i}}$$

is the transmission power to be used by the at least one output for transmissions to a radio unit i of the one or more radio units, $PL_{d_i}$ is an estimated path loss of the downlink component for transmissions to the radio unit i, and $P_{IF,z,NF}$ is based on an interference power OF), a thermal noise (z), and a receive noise figure (NF) of the downlink component, and/or (ii) information related to a subset of antenna elements of a plurality of antenna elements to be used for transmitting on the one or more wireless fronthaul links is determined, and wherein the information related to the transmission power to be used by the at least one output for transmissions on the one or more wireless fronthaul links comprises the information related to the subset of antenna elements.

12. A computer program product comprising a non-transitory computer readable medium having computer readable program code embodied therein, the computer readable program code being configured to implement the method of claim 11, when being loaded on a computer, a processor, or a programmable hardware component.

13. Method A method for a radio unit of a base station transceiver of a mobile communication system, the base station transceiver further comprising a base band unit wirelessly communicating with the radio unit using a wireless fronthaul link, the method comprising:

receiving a reference signal from the base band unit;

looping back a loopback version of the received reference signal to the base band unit;

receiving transmission control information from the base band unit, wherein the transmission control information comprises information related to a per-radio unit transmission power to be used by the radio unit for transmissions on the wireless fronthaul link;

adapting the transmission power for transmissions on the wireless fronthaul link based on the transmission control information;

wherein the per-radio unit transmission power is determined based on an estimated interference and an estimated path loss, wherein the estimated path loss is estimated based on the reference signal and the loopback version of the reference signal; and wherein the per-radio unit transmission power is determined based on an optimization function, wherein the per-radio unit transmission power is determined such that a target Signal-to-Interference and Noise (SINR) for the uplink component is approximated based on $$SINR_{target,u} = P_{tx_{c_i}} - PL_{u_i} - P_{IF,z,NF}$$

wherein $SINR_{target,u}$ is the target SINR for the uplink component, $$P_{tx_{c_i}}$$

is me per-radio unit transmission power of a radio unit i of the one or more radio units, $PL_{u_i}$ is an estimated path loss of the uplink component of the radio unit i, and $P_{IF,z,NF}$ is based on an interference power (IF), a thermal noise (z), and a receive noise figure (NF) of the uplink component.

14. A computer program product comprising a non-transitory computer readable medium having computer readable program code embodied therein, the computer readable program code being configured to implement the method of claim 13, when being loaded on a computer, a processor, or a programmable hardware component.

* * * * *